United States Patent
Ohsuga et al.

(10) Patent No.: US 6,317,151 B1
(45) Date of Patent: *Nov. 13, 2001

(54) IMAGE REPRODUCING METHOD AND IMAGE GENERATING AND REPRODUCING METHOD

(75) Inventors: Mieko Ohsuga; Isao Mizukura, both of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,926

(22) Filed: Jan. 5, 1998

(30) Foreign Application Priority Data

Jul. 10, 1997 (JP) .................................... 9-185547

(51) Int. Cl.[7] ............................... H04N 7/00; H04N 5/225

(52) U.S. Cl. ................................. 348/36; 348/38; 348/39; 348/169

(58) Field of Search ................................ 348/36, 37, 38, 348/39, 61, 121, 159, 169, 170, 171, 172; 463/36; 482/8

(56) References Cited

U.S. PATENT DOCUMENTS

| | | | | |
|---|---|---|---|---|
| 5,130,794 | * | 7/1992 | Ritchey | 348/39 |
| 5,473,364 | * | 12/1995 | Burt | 348/47 |
| 5,497,188 | * | 3/1996 | Kaye | 348/36 |
| 5,702,323 | * | 12/1997 | Poulton | 482/8 |
| 5,704,836 | * | 1/1998 | Norton et al. | 463/36 |
| 5,803,810 | * | 9/1998 | Norton et al. | 463/36 |

FOREIGN PATENT DOCUMENTS 7-80096    3/1995    (JP) .

* cited by examiner

*Primary Examiner*—Chris Kelley
*Assistant Examiner*—Allen Wong
(74) *Attorney, Agent, or Firm*—Sughrue, Mion, Zinn, Macpeak & Seas, PLLC (57) ABSTRACT

At each of n shooting (or capturing) points, a natural scene is captured for a period of time $t_S(N)$, where N=1 to n, using one or more video cameras held at rest, and it is then converted into each of a plurality of stationary-viewpoint images. Furthermore, on the way from the (N−1)th shooting point to the Nth (N=2 to n) shooting point, a natural scene is captured for a period of time $t_M(N)$, where N=2 to n, using the video cameras being moved and it is then converted into each of a plurality of moving-viewpoint images. In order to provide a virtual reality environment for a user, the plurality of stationary-viewpoint images and the plurality of moving-viewpoint images are reproduced in turn according to user's movements detected.

16 Claims, 6 Drawing Sheets

● SHOOTING (OR CAPTURING) POINT

IMAGE REPRODUCING METHOD AND IMAGE GENERATING AND REPRODUCING METHOD

BACKGROUND OF THE INVENTION

1. Field of the Invention

The present invention relates to an image reproducing method, an image reproducing system using the method, and an image generating and reproducing method for providing a user that takes exercise with a series of images which can be varied according to user's movements when the user moves in a virtual reality environment which is created by the series of images and so on while he or she is using his or her body, for example, he or she walks, pedals a bicycle, does skating or roller-skating, or climbs a rocky mountain with both hands and both legs in the virtual reality environment.

2. Description of the Prior Art

Physical training machines such as indoor walking machines, and stationary bicycles, and apparatuses which can receive inputs through a joy stick or detect human being's movements to provide an artificial experience for the user exist in a form of making the user feel as if he or she is moving in a given artificial environment, which will be referred to as a virtual reality environment, by providing the user that is using such a machine with a series of images, which is one of elements that bring the realism into the user, according to user's movements. In order to provide a virtual reality environment for the user, natural scenes are captured and then converted into real-life images in advance. Thus such a machine or an apparatus can provide the user with a virtual reality environment by making appropriate changes to the on-screen image, which was converted from a natural scene captured using a video camera or the like, according to user's movements.

A prior art method of reproducing a series of images to generate a virtual reality environment includes the steps of converting each frame of each image which was converted from a natural scene captured using a video camera being moved at a low constant speed into a digital file, prestoring digital files in a medium such as a laser disc (LD), and reproducing digital files while thinning out some files according to user's movements. For example, reproducing every other digital file stored in the medium generates on-screen images which can be varied at a speed two times as fast as the original images were created. Reproducing every third digital file stored in the medium generates on-screen images which can be varied at a speed three times as fast as the original images were created.

While such the prior art method presents no problem as long as it reproduces a series of real-life image which was converted from natural scenes including a stationary object such as a building, a road, or a mountain captured using a video camera or the like according to a user's moving speed, it has a problem that, when reproducing a series of real-life images which was converted from natural scenes including a moving object such as the shaking of trees rustling in the wind, or a bird flying in the air, the user can sense that the speed of the shaking of trees or the flying speed of the bird is varied according to his or her movements, and this results in impairing the realism of the virtual reality environment. Furthermore, unnatural scene transitions between images displayed successively on the screen can cause the user to get motion sickness under certain circumstances depending on the user's moving speed.

Japanese Patent Application No. 313860 filed 1996, titled "Wellness System", and assigned to the assignee of the present invention discloses a step dynamic image reproducing method including the steps of storing a plurality of dynamic image cuts which were respectively shot or captured using an image generating device at rest such as a video camera placed at each of a plurality of shooting (or capturing) points which were arranged on a path in the real world along which the user will feel as if he or she moves in the virtual reality environment, and reproducing the series of dynamic image cuts while forwarding it cut by cut, to solve the above problem with the prior art method.

While the step dynamic image reproducing method disclosed in Japanese Patent Application No. 313860 solves the above problems that the realism of the virtual reality environment is impaired and the user gets motion sickness because of unnatural scene transitions between images displayed successively on the screen, the method has a disadvantage that the user cannot feel as if he or she is moving smoothly in the virtual reality environment because the plurality of shooting points are apart from each other and hence the continuity of the series of dynamic image cuts cannot be ensured, so that the user may feel as if he or she jumps between two adjacent shooting points each time he or she moves, for example, each time he or she takes a step when the user gets walking training.

SUMMARY OF THE INVENTION

The present invention is made to overcome the above-mentioned problems. It is therefore an object of the present invention to provide an image reproducing system, a computer-implemented image reproducing method, and an image generating and reproducing method capable of reproducing a series of images which was converted from natural scenes including moving objects according to user's movements so that the user can have a feeling that he or she is moving smoothly in the virtual reality environment without having a feeling of physical disorder.

In accordance with one aspect of the present invention, there is provided an image reproducing system comprising: an image storage unit for storing a plurality of stationary-viewpoint images each of which was converted from a natural scene captured using an image generating device such as a video camera which was placed at each of a plurality of predetermined shooting (or capturing) points and was held at rest, and for storing a plurality of moving-viewpoint images each of which was converted from a natural scene captured on the way from each of the plurality of shooting points to the next shooting point using the image generating device which was being moved, so as to provide a virtual reality environment for a user, the plurality of shooting points starting from a shooting start point being arranged on a path along which the user will move in the virtual reality environment, and each of the plurality of shooting points starting from the shooting start point which corresponds to a start point from which the user will start to move in the virtual reality environment being referred to as the Nth shooting point (N=1 to n, and n is the number of the plural shooting points); a movement detecting unit for detecting a movement of the user in the virtual reality environment; and a reproducing unit for reproducing the plurality of stationary-viewpoint images and the plurality of moving-viewpoint images stored in the image storage unit in turn according to user's movements detected by the movement detecting unit.

In a preferred embodiment of the aspect of the present invention, the image reproducing system further comprises an environment database for storing environment data on environments at the plurality of shooting points and on the way from each of the plurality of shooting points to the next shooting point, and a load providing unit for providing the user with a load dependent on the environment data when the reproducing unit reproduces one stationary-viewpoint image or one moving-viewpoint image.

Preferably, if the movement detecting unit detects user's movements while the reproducing unit is reproducing a stationary-viewpoint image which was created at the Nth shooting point, the reproducing unit is switched to reproduction of a moving-viewpoint image which was created on the way to the (N+1)th shooting point. Furthermore, unless the movement detecting unit detects user's movements after the completion of the reproduction of the moving-viewpoint image which was created on the way to the (N+1)th shooting point, the reproducing unit is caused to reproduce a stationary-viewpoint image which was created at the (N+1)th shooting point next. Unless the movement detecting unit detects user's movements while the reproducing unit is reproducing a stationary-viewpoint image which was created at the Nth shooting point for a predetermined period of time, the reproducing unit is caused to reproduce the same stationary-viewpoint image repeatedly. If the movement detecting unit detects user's movements after the reproducing unit reproduces the moving-viewpoint image which was created on the way to the (N+1)th shooting point for a predetermined period of time, the reproducing unit is caused to reproduce a moving-viewpoint image which was created on the way to the (N+2)th shooting point next.

In accordance with another aspect of the present invention, there is provided a computer-implemented image reproducing method comprising the steps of: detecting a movement of a user in a virtual reality environment; and reproducing a plurality of stationary-viewpoint images and a plurality of moving-viewpoint images stored in an image storage unit in turn according to user's movements detected in the above detecting step, each of the plurality of stationary-viewpoint images being converted from a natural scene captured using an image generating device such as a video camera which was placed at each of a plurality of predetermined shooting (or capturing) points and was held at rest, each of the plurality of moving-viewpoint images being converted from a natural scene captured on the way from one of the plurality of shooting points to the next shooting point using the image generating device which was being moved, the plurality of shooting points starting from a shooting start point being arranged on a path along which the user will move in the virtual reality environment, and each of the plurality of shooting points starting from the shooting start point which corresponds to a start point from which the user will start to move in the virtual reality environment being referred to as the Nth shooting point (N=1 to n, and n is the number of the plural shooting points).

Preferably, if user's movements are detected in the detecting step while a stationary-viewpoint image which was created at the Nth shooting point is being reproduced, switching to reproduction of a moving-viewpoint image which was created on the way to the (N+1)th shooting point is performed. Furthermore, unless user's movements are detected in the detecting step after the completion of the reproduction of the moving-viewpoint image which was created on the way to the (N+1)th shooting point, a stationary-viewpoint image which was created at the (N+1)th shooting point is reproduced next. Unless user's movements are detected in the detecting step while a stationary-viewpoint image which was created at the Nth shooting point is being reproduced for a predetermined period of time, the same stationary-viewpoint image is reproduced repeatedly. If user's movements are detected in the detecting step after the moving-viewpoint image which was created on the way to the (N+1)th shooting point is reproduced for a predetermined period of time, a moving-viewpoint image which was created on the way to the (N+2)th shooting point is reproduced next.

In accordance with another aspect of the present invention, there is provided a method of generating and reproducing images, comprising the steps of: generating each of a plurality of stationary-viewpoint images by capturing and converting a natural scene into each of the plurality of stationary-viewpoint images at each of a plurality of predetermined shooting points using an image generating device such as a video camera which is held at rest at each of the plurality of shooting points, and generating each of a plurality of moving-viewpoint images by capturing and converting a natural scene into each of the plurality of moving-viewpoint images on the way from each of the plurality of shooting points to the next shooting point using the image generating device which is being moved, so as to provide a virtual reality environment for a user, the plurality of shooting points starting from a shooting start point being arranged on a path along which the user will move in the virtual reality environment, and each of the plurality of shooting points starting from the shooting start point which corresponds to a start point from which the user will start to move in the virtual reality environment being referred to as the Nth shooting point (N=1 to n, and n is the number of the plural shooting points); storing the plurality of stationary-viewpoint images and the plurality of moving-viewpoint images; detecting a movement of the user in the virtual reality environment; and reproducing the plurality of stationary-viewpoint images and the plurality of moving-viewpoint images stored in the above storing step in turn according to user's movements detected in the above detecting step.

In a preferred embodiment of the above aspect of the present invention, the method further comprises the steps of measuring environment data on environments at each of the plurality of shooting points and on the way from one of the plurality of shooting points to the next shooting point, storing the environment data measured in the above measuring step, and providing the user with a load dependent on the environment data stored in the above storing step while one stationary-viewpoint image or one moving-viewpoint image is reproduced in the reproducing step.

Preferably, if user's movements are detected in the detecting step while a stationary-viewpoint image which was created at the Nth shooting point is being reproduced, switching to reproduction of a moving-viewpoint image which was created on the way to the (N+1)th shooting point is performed. Furthermore, unless user's movements are detected in the detecting step after the completion of the reproduction of the moving-viewpoint image which was created on the way to the (N+1)th shooting point, a stationary-viewpoint image which was created at the (N+1)th shooting point is reproduced next. Unless user's movements are detected in the detecting step while a stationary-viewpoint image which was created at the Nth shooting point is being reproduced for a predetermined period of time, the same stationary-viewpoint image is reproduced repeatedly. If user's movements are detected in the detecting step after the moving-viewpoint image which was created on the way to the (N+1)th shooting point is reproduced for a predetermined period of time, a moving-viewpoint image which was created on the way to the (N+2)th shooting point is reproduced next.

Further objects and advantages of the present invention will be apparent from the following description of the preferred embodiments of the invention as illustrated in the accompanying drawings.

DETAILED DESCRIPTION OF THE PREFERRED EMBODIMENT

Figure 1:
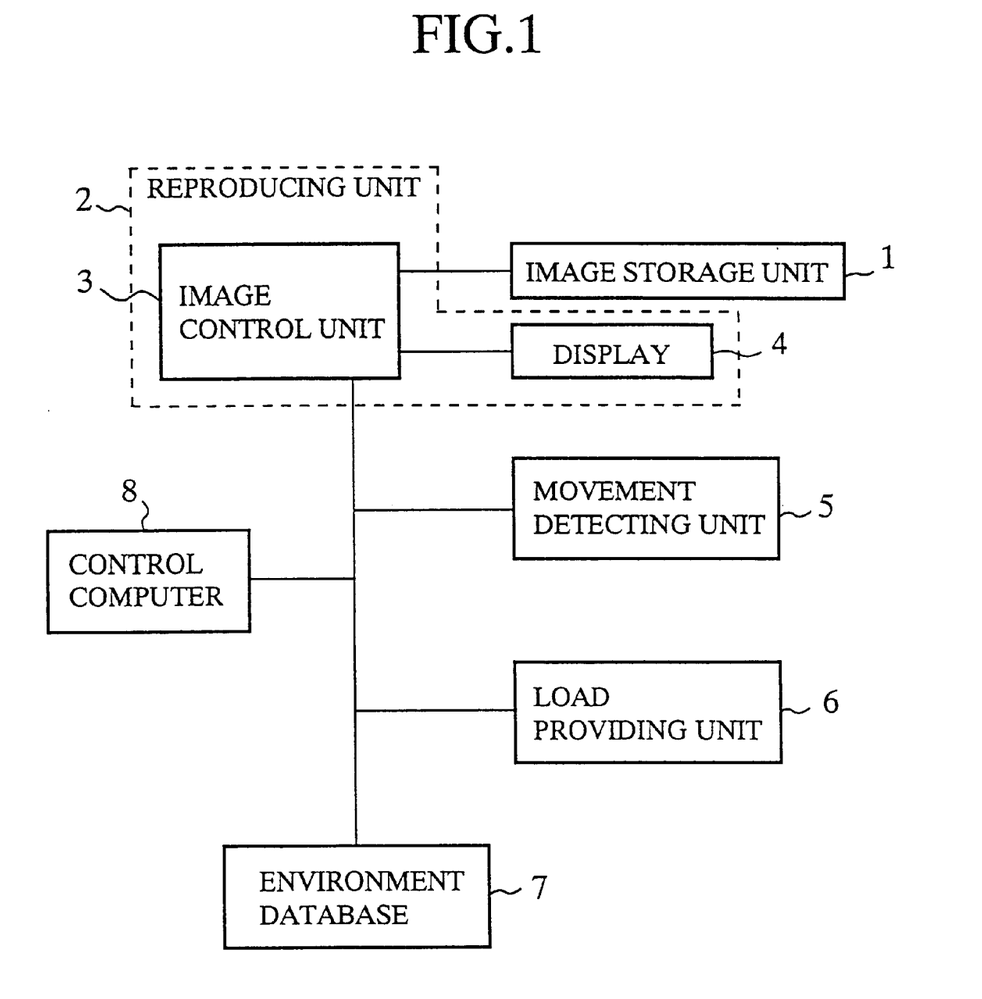
FIG. 1 is a block diagram showing the structure of an image reproducing system according to an embodiment of the present invention.

Referring now to FIG. 1, there is illustrated a block diagram showing the structure of an image reproducing system according to an embodiment of the present invention. In FIG. 1, reference numeral 1 denotes an image storage unit for storing image data which constructs a virtual reality environment to be provided for the user, and 2 denotes a reproducing unit for reproducing a series of images stored in the image storage unit 1. The reproducing unit 2 includes an image control unit 3 for carrying out controlling operations to store and reproduce the series of images and a display 4 for displaying the series of images on the screen thereof in turn. Furthermore, reference numeral 5 denotes a movement detecting unit for detecting user's movements, for example, user's stepping, 6 denotes a load providing unit for providing the user with a physical load, 7 denotes an environment database for storing environment data such as data on the hardness and condition of the ground at each of shooting (or capturing) points which will be explained below and so on, which construct the virtual reality environment to be provided in cooperation with the series of images, and 8 denotes a control computer for controlling the whole of the image reproducing system according to the embodiment of the present invention.

In this embodiment, image data to be stored in the image storage unit 1 and environment data to be stored in the environment data base 7 can be generated using a step dynamic image capturing method according to the present invention.

Figure 2:
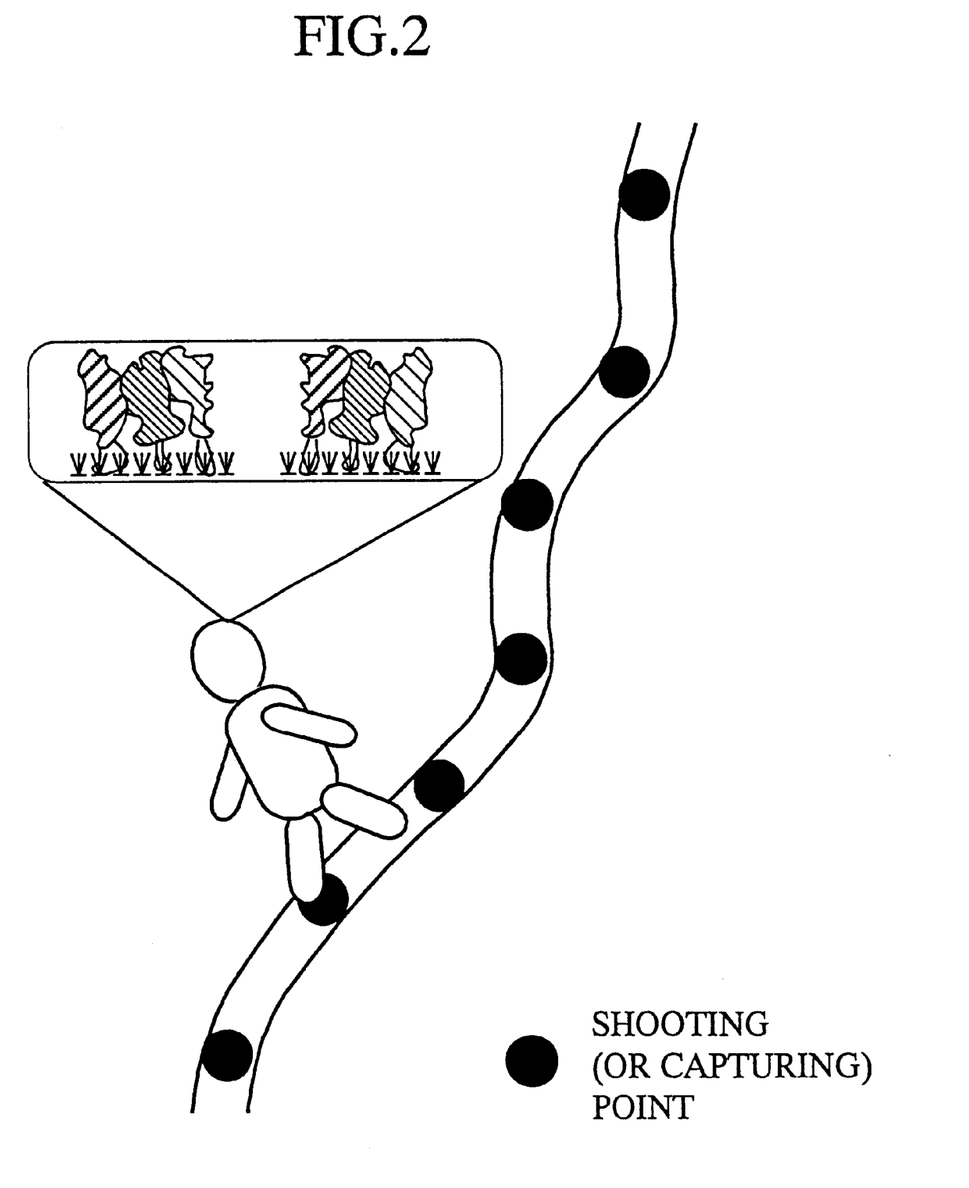
FIG. 2 is a view showing a plurality of shooting (or capturing) points where natural scenes are captured and converted into a series of images using a step dynamic image capturing method according to the present invention.

Referring next to FIG. 2, there is illustrated a view showing a plurality of shooting (or capturing) points where natural scenes are captured and converted into a series of images using the step dynamic image capturing method of the present invention. When the contents of the virtual reality environment provided for the user is related to a situation in which the user walks in a park, natural scenes are captured at the park in the real world which will be the stage where the user walks in the virtual reality environment so as to generate a series of images which constructs the virtual reality environment. At that time, a plurality of shooting points where a plurality of images are to be generated respectively are predetermined so that they are arranged at predetermined intervals of, for example, one foot or a few feet of an average human being. One or more video cameras held in a horizontal state are placed in turn at each of the plurality of capturing points while positioning the video cameras at eye level of an average human being and pointing the video cameras to the direction which the user is to be headed in the virtual reality environment, for example, the direction of the tangent line of a path (or road) on which the user will walk in the virtual reality environment.

Furthermore, on the way from each of the plurality of shooting points to the next shooting point, a natural scene is continuously captured and converted into an image while moving the video cameras. When the video cameras reach the next shooting point, another natural scene is continuously captured and converted into another image while placing the video cameras at the shooting point and then holding the video cameras at rest. In this specification, an image generated by holding the video cameras at rest will be referred to as "a stationary-viewpoint image", and an image generated by moving the video cameras will be referred to as "a moving-viewpoint image" hereinafter.

Figure 3:
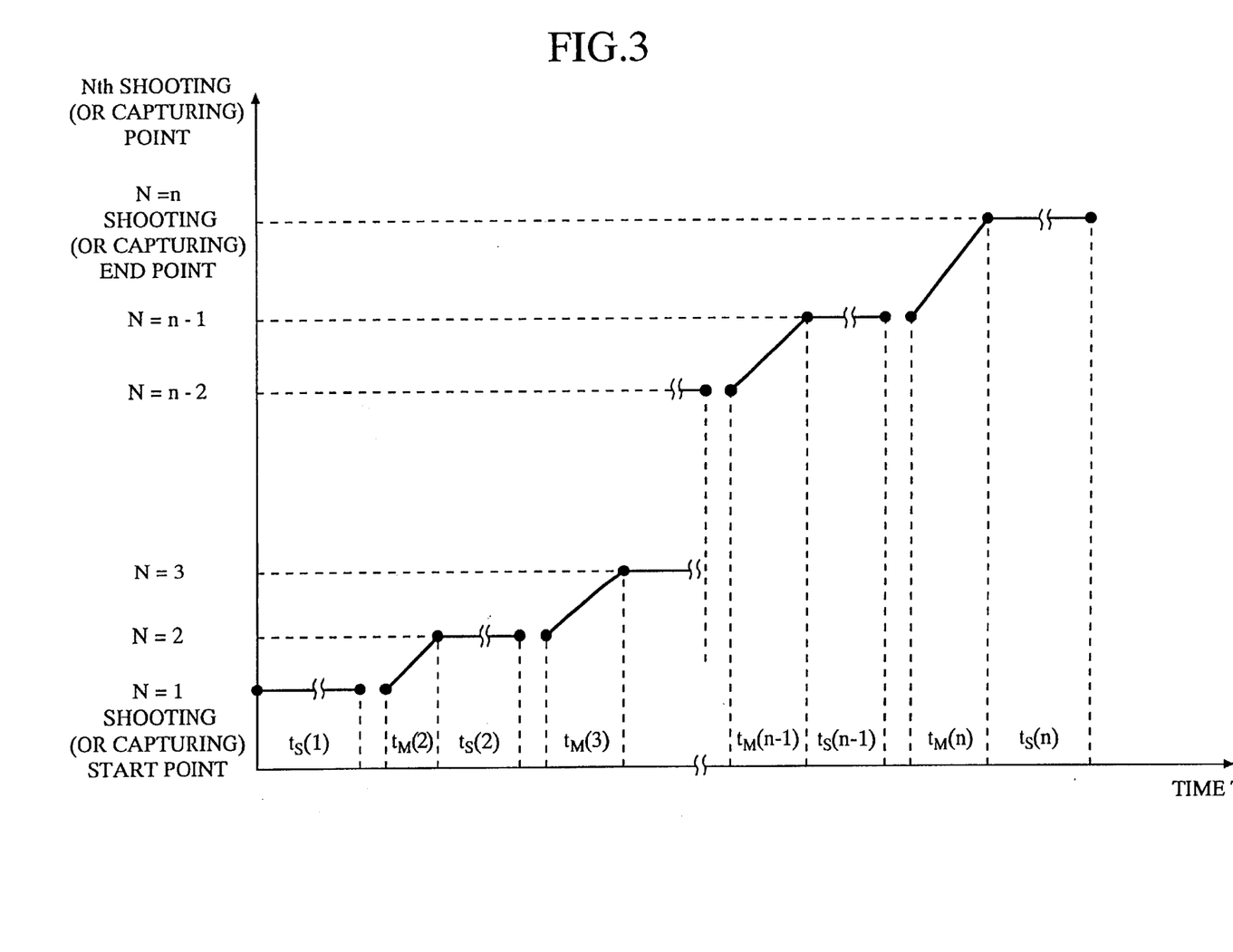
FIG. 3 is a diagram showing the lengths of capturing times that natural scenes are captured so as to generate a plurality of stationary-viewpoint images at a plurality of shooting (or capturing) points and a plurality of moving-viewpoint images on the way from each of the plurality of shooting points to the next shooting point according to the image capturing method according to the present invention.

Referring next to FIG. 3, there is illustrated a diagram showing the lengths of capturing times that natural scenes are captured so as to generate a plurality of stationary-viewpoint images at a plurality of capturing points and a plurality of moving-viewpoint images on the way from each of the plurality of capturing points to the next capturing point according to the image capturing method of the present invention. The plurality of shooting points starting from a shooting start point which corresponds to a start point from which the user will start to move in the virtual reality environment are arranged on a path along which the user will move in the virtual reality environment, and the plurality of shooting points starting from the shooting start point can be numbered starting with 1. That is, each of the plurality of shooting points starting from the shooting start point will be referred to as the Nth shooting point (N=1 to n, and n is the number of the plurality of shooting points).

A natural scene is captured for a predetermined period of time and is converted into a stationary-viewpoint image using one or more video cameras at rest placed at each of the n shooting points from the shooting start point (N=1) to the shooting end point (N=n). Furthermore, a natural scene is captured for a predetermined period of time and is converted into a moving-viewpoint image by using and moving the video cameras from each of the plurality of shooting points to the next shooting point. Reference characters $t_S(N)$, which are seen along the horizontal axis with respect to time, denote the length of shooting time during that a natural scene is captured using the video cameras held at rest to generate a stationary-viewpoint image, and reference characters $t_M(N)$ denote the length of shooting time that a natural scene is captured using the video camera being moved to generate a moving-viewpoint image. The shooting times $t_S(N)$ for all the stationary-viewpoint images can be the same as each other, and the shooting times $t_M(N)$ for all the moving-viewpoint images can be the same as each other. Alternatively, the shooting times $t_S(N)$ for all the stationary-viewpoint images can differ from each other according to the situations of the plurality of shooting points. Also, the shooting times $t_M(N)$ for all the moving-viewpoint images can differ from each other according to the situations of the plurality of shooting points. It is desirable that the shooting time $t_S(N)$ for each stationary-viewpoint image falls within a range from 5 seconds to 30 seconds, and the shooting time $t_M(N)$ for each moving-viewpoint image is about 0.5 seconds which corresponds to one step having a range of 60 cm to 80 cm. The settings of the shooting times can yield a good result when reproducing the plurality of images.

The plurality of image thus generated are compressed using for example a motion-picture compression coding method which was developed by the Motion Picture Expert Group (MPEG) of the ISO. The compressed images are then stored in the image storage unit 1. Furthermore, the values of the shooting times $t_S(N)$ and $t_M(N)$ for the respective shooting points are stored in a memory not shown within the control computer 8.

Figure 4:
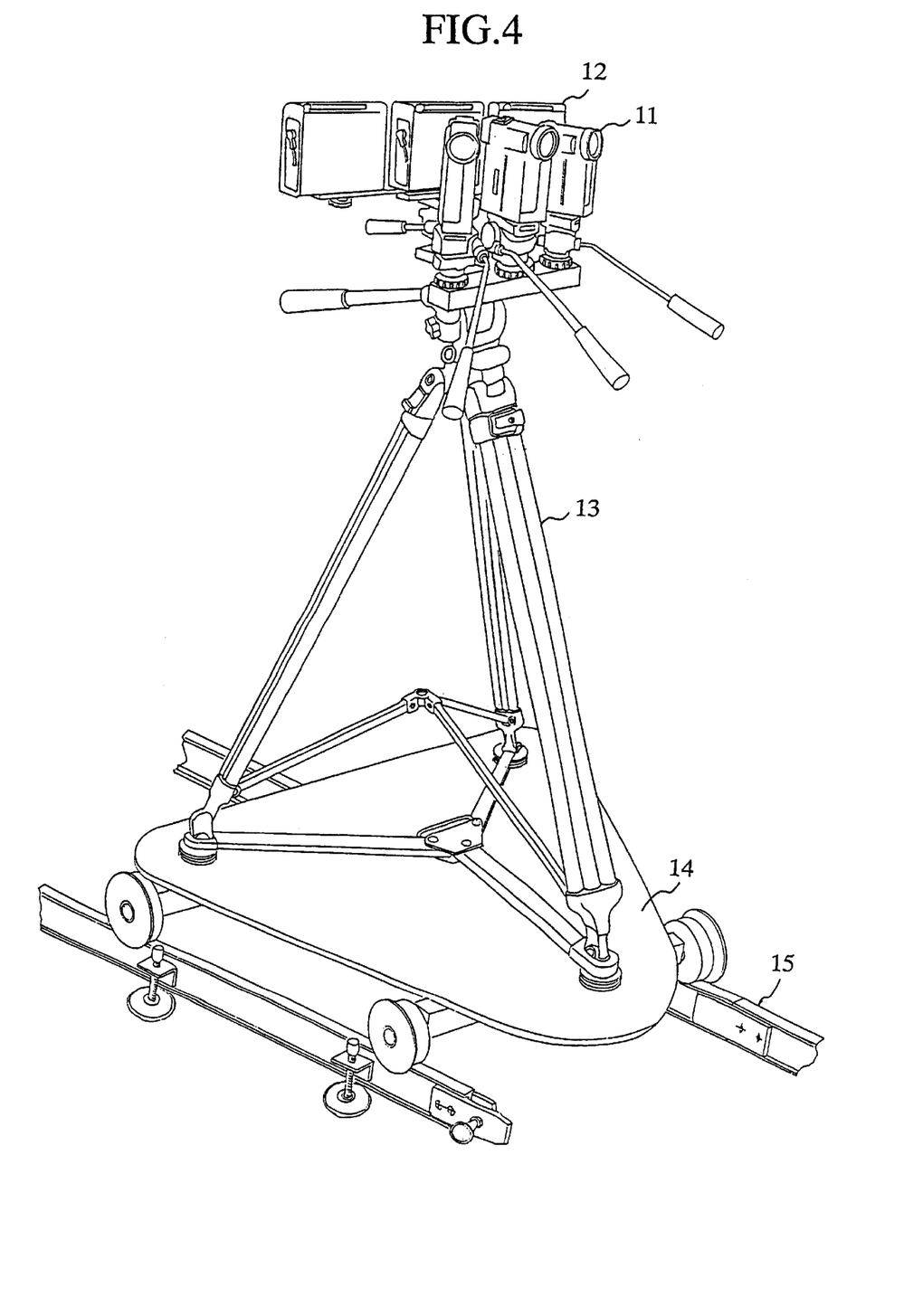
FIG. 4 is a perspective view showing the structure of an image capturing apparatus according to the present invention.

Referring next to FIG. 4, there is illustrated a perspective view showing the structure of an image capturing apparatus according to this preferred embodiment of the present invention. Natural scenes can be captured by using the image shooting apparatus shown in the figure to generate a plurality of stationary-viewpoint and a plurality of moving-viewpoint images. A plurality of video cameras 11 and a plurality of monitors 12 are securely placed on a tripod 13 secured to a table 14. The table 14 can be moved smoothly on a pair of rails 15 so that there is no unintentional movement of the video cameras 11. The pair of rails 15 prepared is 10 meters long, so that a natural scene can be captured to generate a moving-viewpoint image by moving the plurality of video cameras 11 on the table 14 at an appropriate speed in such a manner that the set of video cameras which started from 60 cm to 80 cm before each shooting point except the shooting end point reaches the next shooting point in about 0.5 seconds. When the table 14 together with the plurality of video cameras 11 reaches each shooting point except the shooting start point, a natural scene is further captured for 5 to 30 seconds by placing and using the plurality of video cameras 11 held at rest at each shooting point to generate a stationary-viewpoint image.

In addition, the inclination of the ground, and the condition of the ground such as hardness and quality can be measured at each shooting point and on the way from each of the plurality of shooting points to the next shooting point in order to apply a physical load to the user according to the virtual reality environment. The environment database 7 stores control parameters for controlling the magnitude of the physical load applied to the user according to the inclination and condition of the ground.

Figure 5:
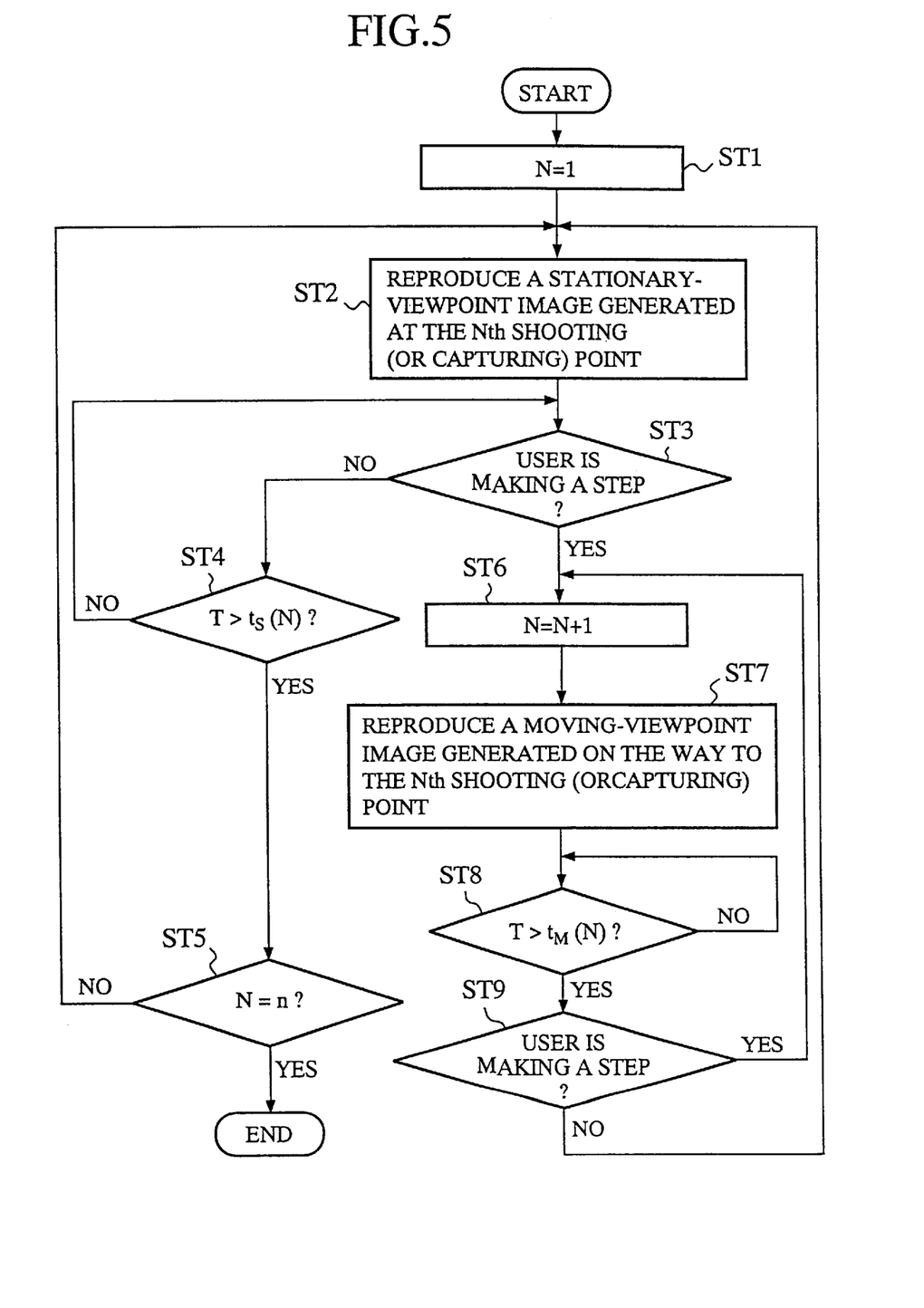
FIG. 5 is a flow diagram showing the procedure of reproducing stationary-viewpoint and moving-viewpoint images in turn according to an image reproducing method of the present invention.

Referring next to FIG. 5, there is illustrated a flow diagram showing the procedure of reproducing stationary-viewpoint and moving-viewpoint images according to an image reproducing method of the present invention. FIGS. 6a through 6d are diagrams each showing the length of reproducing time that each image which was generated at each shooting point or on the way from each of the plurality of shooting points to the next shooting point is reproduced according to the image reproducing procedure shown in FIG. 5. In the figures, reference characters $t_S(N)$ denote the length of reproducing time that a stationary-viewpoint image is reproduced, and reference characters $t_M(N)$ denote the length of reproducing time that a moving-viewpoint image is reproduced.

The control computer 8 first, in step ST1, sets the number N of a stationary-viewpoint image to be reproduced to 1, as shown in FIG. 5. In other words, the control computer 8 first selects the stationary-viewpoint image which was generated at the shooting start point, i.e., the first shooting point. A plurality of stationary-viewpoint images stored in the image storage unit 1 are numbered starting with 1 so that the number of each of the plurality of stationary-viewpoint images corresponds to the number of each of the n shooting points as shown in FIG. 3, respectively. The control computer 8, in step ST2, then gives an instruction to the image control unit 3 so as to cause the image control unit 3 to reproduce the stationary-viewpoint image which was generated at the Nth shooting point and which is selected in the previous step. In this case, the control computer 8 gives an instruction to cause the image control unit 3 to reproduce the stationary-viewpoint image which was generated at the first shooting point (i.e., shooting start point) in a way that the user will think he or she sees the scene captured at the shooting start point in the virtual reality environment. When the image control unit 3 receives the instruction from the control computer 8, the image control unit 3 reads corresponding image data from the image storage unit 1. The image control unit 3 then expands the image data which were compressed with an MPEG compression method or the like by means of an image expanding circuit board not shown and delivers the expanded image data to the display 4 so as to display the stationary-viewpoint image on the screen of the display 4. When the reproduction of the stationary-viewpoint image which was converted from the scene captured at the first shooting point is started, the control computer 8 provides an instruction to advance to step ST3.

In step ST3, the movement detecting unit 5 determines whether or not the user is making a step for his or her walking training. When the user is not making a step, the control computer 8, in step ST4, determines if the length of the reproducing time T that elapsed after the reproduction of the stationary-viewpoint image generated at the first capturing point and started in step ST2 exceeds the length of the shooting time $t_S(1)$ for the stationary-viewpoint image, which is stored in the memory (not shown) of the control computer 8. When the length of the reproducing time T does not exceed that of the shooting time $t_S(1)$, the control computer 8 gives an instruction to return to step ST3 wherein it causes the movement detecting unit 5 to determine if the user is making a step. When the length of the reproducing time T exceeds that of the shooting time $t_S(1)$, the control computer 8 gives an instruction to proceed to step ST5.

Figure 6:
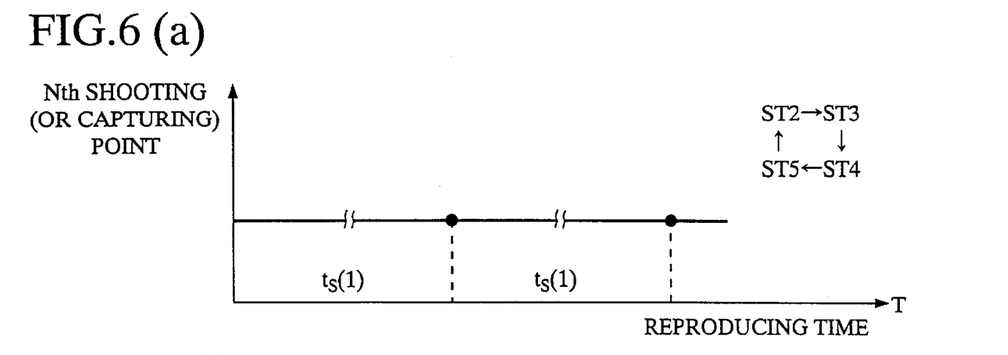
FIGS. 6a through 6d are diagrams each showing the length of reproducing time that each image which was generated at each shooting point or on the way from each of the plurality of shooting points to the next shooting point is reproduced according to the image reproducing method shown in FIG. 5.

In step ST5, the control computer 8 determines whether the number N of the stationary-viewpoint image being reproduced is n, that is, whether the stationary-viewpoint image being reproduced was converted from a natural scene captured at the shooting end point using the video cameras at rest. In this case, since N is 1, the control computer 8 returns to step ST2 wherein it causes the image control unit 3 to reproduce the stationary-viewpoint image which was generated at the first shooting point again. FIG. 6a shows such the reproduction processing mentioned above when the same stationary-viewpoint image is reproduced repeatedly according to the steps ST2 through ST5 with the order ST2→ST3→ST4→ST5→ST2. Thus the reproduction processing can provide a more realistic virtual reality environment for the user even though the user is at rest.

On the other hand, when the movement detecting unit 5, in step ST3, detects that the user is making a step while the stationary-viewpoint image which was created at the first shooting point is reproduced, the control computer 8 advances to step ST6 wherein it increments the number N of an image to be reproduced next. In this case, the control computer 8 selects the first moving-viewpoint image which was created on the way from the first shooting point, i.e, the shooting start point, to the second shooting point, as an image to be displayed next on the screen of the display 4. A plurality of moving-viewpoint images stored in the image storage unit 1 are numbered starting with 2 so that the number of each of the plurality of moving-viewpoint images corresponds to the number of each of the (n−1) shooting points except the shooting start point as shown in FIG. 3, respectively. The control computer 8 then in step ST7 gives an instruction to the image control unit 3 to cause the image control unit 3 to switch to reproduction of the moving-viewpoint image which was created on the way to the Nth shooting point, in this case, on the way to the second shooting point.

When the reproduction of the moving-viewpoint image which was created on the way to the second shooting point is started, the control computer 8 advances to step ST8 wherein it determines if the length of the reproducing time T that elapsed after the reproduction of the moving-viewpoint image created on the way to the second shooting point and started in step ST7 exceeds the length of the shooting time $t_M(2)$ for the moving-viewpoint image, which is stored in the memory (not shown) of the control computer 8. When the length of the reproducing time T does not exceed that of the shooting time $t_M(2)$, the control computer 8 repeats step ST8 wherein it determines if the reproducing time T exceeds the shooting time $t_M(2)$ again. When the length of the reproducing time T exceeds that of the shooting time $t_M(2)$, the control computer 8 gives an instruction to proceed to step ST9 wherein it causes the movement detecting unit 5 to determine if the user is making a step. When the movement detecting unit 5 does not detect a user's step, the control computer 8 gives an instruction to return to step ST2 wherein the image control unit 3 then reproduces the second stationary-viewpoint image which was created at the second shooting point. FIG. 6b shows such the reproduction processing which is carried out according to the steps ST2, ST3, and ST6 through ST9 with the order ST2→ST3→ST6→ST7→ST8→ST9→ST2.

When the movement detecting unit 5, in step ST9, detects a user's step, the control computer 8 advances to step ST6 wherein it increments the number N of a moving-viewpoint image to be reproduced next. The image control unit 3 then reproduces the second moving-viewpoint image which was created on the way to the third shooting point without reproducing the second stationary-viewpoint image which was created at the second shooting point. FIG. 6c shows such the reproduction processing which is carried out according to the steps ST2, ST3, and ST6 through ST9 with the order ST2→ST3→ST6→ST7→ST8→ST9→ST6. Thus the reproduction processing can provide the user with a more realistic virtual reality environment which can be varied quickly in response to user's movements even though the user makes a step speedily at an appropriate speed.

As mentioned above, the method of this embodiment includes step ST8 wherein the control computer 8 determines if the length of the reproducing time T that elapsed after the reproduction of a moving-viewpoint image started in step ST7 exceeds the length of the shooting time $t_M(N)$ for the moving-viewpoint image before it in step ST9 determines if the user is making a step. This is because the control computer 8 would execute the loop comprised of steps ST9, ST6, and ST 7 rapidly and repeatedly when the user made a step quickly unless the method included step ST8. Step ST8 in FIG. 5 is thus provided to prevent such the reproduction processing in which a series of moving-viewpoint images is reproduced partially and discretely, as shown in FIG. 6d.

As previously explained, the shooting time $t_M(N)$ that a natural scene is captured so as to generate a moving-viewpoint image is about 0.5 seconds long. This is because if the length of the shooting time were greater than 0.5 seconds the control computer 8 could not advance to step ST9 wherein it determines if the user is making a step until the reproducing time for a moving-viewpoint being reproduced exceeds the shooting time even if the user made a further step, so that it would take a long time for the control computer 8 to switch to the reproduction of the next moving-viewpoint image, and this would result in providing the use with a feeling of physical disorder.

In the aforementioned reproduction processing, when the user makes a step, the control computer 8 causes the image control unit 3 to change the scene including physical objects seen in a park reproduced on the screen of the display 4 to the next scene seen in the park that the user who has made a step will view in the virtual reality environment. When the control computer 8 of the image reproducing system of the embodiment thus reproduces the plurality of stationary-viewpoint images and the plurality of moving-viewpoint images in turn and then, in step ST5, detects that the number N of the stationary-viewpoint image being reproduced is n, that is, the control computer 8 determines that the stationary-viewpoint image being reproduced was created at the shooting end point, i.e., the nth shooting point, it gives an instruction to cause the image control unit 3 to terminate the image reproduction processing.

In step ST4 shown in FIG. 5, the control computer 8 determines whether the length of the reproducing time T that elapsed after the reproduction of a stationary-viewpoint image exceeds the length of the shooting time $t_S(N)$ for the moving-viewpoint image. Similarly, in step ST8 shown in FIG. 5, the control computer 8 determines whether the length of the reproducing time T that elapsed after the reproduction of a moving-viewpoint image exceeds the length of the shooting time $t_M(N)$ for the moving-viewpoint image. Actually, it is needed that the values of the shooting times $t_S(N)$ and $t_M(N)$ which are used for the comparison processes are set to be less than their true values so as to prevent a delay of the reproduction of a stationary-viewpoint image or a moving-viewpoint image to be reproduced next which is caused by a delay in control of the whole of the image reproducing system.

The control computer 8 reads the environment data on the environment at one of the plurality of shooting points or on the way from one of the plurality of shooting points to the next shooting point, which are stored in the environment database 7. The control computer 8 then delivers the environment data to the load providing unit 6. For example, the image reproducing system of the present invention can cause the user to feel the difference of the surface condition of a road along which the user is walking or to feel the inclination of the user's feet when the user is walking down or up a sloping road by controlling the load providing unit 6. This results in causing the user to feel as if the user walks along the road in the real world.

In this embodiment, since both the image data and the environment data are generated using the step dynamic image capturing and reproducing method, an image reproduced on the screen is a dynamic image which was converted from a natural scene including a moving object such as the shaking of trees rustling in the wind, or a bird flying in the air. Accordingly, the step dynamic image capturing and reproducing method can provide varied images which causes the user to feel comfortable and not to get tired of doing exercise. As a result, the user does not bring himself or herself to move rapidly to wish for variations in the on screen image, so that the user does not take exercise to excess in response to the on-screen image. Furthermore, the image reproducing system of the present invention can cause the user to feel as if he or she is moving in a three-dimensional space.

In addition, since the image reproducing system of the present invention reproduces a moving-viewpoint image before the reproduction of a stationary-viewpoint image which was created at the next shooting point, the image reproducing system can reproduce the series of images smoothly without causing the user to have a feeling of jumping between two adjacent points each time the user takes a step.

The reproduction processing performed in the steps shown in FIG. 5 can be implemented via a software program for reproducing real-life images according to user's movements. The software program is made available in the form of a recording medium in which the program is stored.

Numerous variants may be made in the exemplary embodiment shown. In the above description, the shooting time $t_S(N)$ for each stationary-viewpoint image is set to 5 seconds to 30 seconds, and the shooting time $t_M(N)$ for each moving-viewpoint image is set to 0.5 seconds, assuming that the user will walk in a virtual park. Alternatively, the shooting times $t_S(N)$ and $t_M(N)$ for each stationary-viewpoint image and each moving-viewpoint image can be respectively set to other appropriate values according to the contents of the virtual reality environment to be provided for the user and the variety of user's movements. It is also apparent that instead of terminating the image reproduction processing when the user reaches the end point in the virtual reality environment, the image reproducing system can be so constructed as to terminate the image reproduction processing when the user pushes a button (not shown) to generate a signal for terminating the image reproduction processing, or when the system detects a user's predetermined movement such as a wave of his or her hand by means of a detecting means (not shown). In either of these cases, the user can terminate the image reproduction processing at any time, for example, when the user feels tired.

In the preferred embodiment mentioned above, the image reproducing system is so constructed as to reproduce a series of images according to user's stepping. Alternatively, in the case where the image reproducing system is used in order for the user that cannot make a step for himself or herself to do a rehabilitation exercise, it is desirable that a means (not shown) for applying a torque to a part of the user's body such as his or her both legs while the user does a rehabilitation exercise is provided so as to cause the user to make a predetermined movement, for example, to make a step, instead of the movement detecting means for detecting user's movements such as user's stepping. In this variant, the image reproducing system is so constructed as to reproduce a series of images successively according to the length of the time interval that the torque applying means applies a torque to the user, so that the image reproducing system of this variant can provide a series of images which is reproduced smoothly and which adds to the realism for the user that cannot make a step for himself or herself. In a variant, in addition to the provision of a series of images which acts on the user's sense of sight for the user, a sound, a wind, a fragrance, and so on which correspond the on-screen image can be further provided so as to implement a more realistic virtual reality environment which also acts on the user's senses of hearing, touch, and smell.

As previously explained, the present invention offers the following advantages.

Since the image reproducing system of the present invention reproduces a plurality of stationary-viewpoint images which were created at a plurality of predetermined shooting points, respectively, and a plurality of moving-viewpoint images in turn according to user's movements in order to provide a virtual reality environment for the user, the image reproducing system can smoothly reproduce the series of images in response to user's movements for the user in the virtual reality environment without causing the user to have a feeling of jumping between two adjacent points each time the user takes a step.

Furthermore, since the image reproducing system of the present invention can apply a physical load to the user according to the environment data, the user can feel as if he or she stays or moves in the real world.

Since the image reproducing system of the present invention reproduces a moving-viewpoint image before the reproduction of a stationary-viewpoint image which was created at the next shooting point when the user makes a predetermined movement, the image reproducing system can smoothly reproduce the series of images in response to user's movements for the user in the virtual reality environment without causing the user to have a feeling of jumping between two adjacent points each time the user takes a step.

In addition, since after the image reproducing system of the present invention reproduces a stationary-viewpoint image which was created at one shooting point for a predetermined period of time, the image reproducing system repeats the reproduction of the stationary-viewpoint image unless the user does make a predetermined movement, the image reproducing system can provide a more realistic virtual reality environment for the user even though the user is at rest.

Furthermore, since when the user makes a predetermined movement just after the reproduction of a moving-viewpoint image which was created on the way to one shooting point, the image reproducing system reproduces the next moving-viewpoint image which was created on the way to the next shooting point, the image reproducing system can provide the user with a more realistic virtual reality environment which can be varied quickly in response to user's movements even though the user makes a predetermined movement speedily.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reproducing system comprising:
   image storage means for storing a plurality of stationary-viewpoint images each of which was converted from a natural scene which was captured using an image generating device which was placed at each of a plurality of predetermined shooting points and was held at rest, and for storing a plurality of moving-viewpoint images each of which was converted from a natural scene which was captured using the image generating device as it was moved on the way from each of the plurality of shooting points to a next shooting point, so as to provide a virtual reality environment for a user, the plurality of shooting points starting from a shooting start point being arranged on a path along which the user will move in the virtual reality environment, and each of the plurality of shooting points starting from the shooting start point which corresponds to a start point from which the user will start to move in the virtual reality environment being referred to as the Nth shooting point (N=1 to n, and n is the number of the plural shooting points), an interval between said shooting points being controlled in accordance with a length of said user's step, movement detecting means for detecting a movement of the user in the virtual reality environment; and reproducing means for reproducing the plurality of stationary-viewpoint images and the plurality of moving-viewpoint images stored in said image storage means in turn according to user's movements detected by said movement detecting means;

wherein said moving viewpoint images are captured using a video camera in a video mode so that said stored moving viewpoint images appear as natural motion to a viewer.

2. The image reproducing system according to claim 1, further comprising an environment database for storing environment data on environments at the plurality of shooting points and on the way from each of the plurality of shooting points to the next shooting point, and load providing means for providing the user with a load dependent on said environment data when said reproducing means reproduces one stationary-viewpoint image or one moving-viewpoint image.

3. The image reproducing system according to claim 1, wherein if said movement detecting means detects user's movements while said reproducing means is reproducing a stationary-viewpoint image which was created at the Nth shooting point, said reproducing means is switched to reproduction of a moving-viewpoint image which was created on the way to the (N+1)th shooting point next, and wherein unless said movement detecting means detects user's movements after the completion of the reproduction of the moving-viewpoint image which was created on the way to the (N+1)th shooting point, said reproducing means is caused to reproduce a stationary-viewpoint image which was created at the (N+1)th shooting point next.

4. The image reproducing system according to claim 3, wherein unless said movement detecting means detects user's movements while said reproducing means is reproducing a stationary-viewpoint image which was created at the Nth shooting point for a predetermined period of time, said reproducing means is caused to reproduce the same stationary-viewpoint image repeatedly.

5. The image reproducing system according to claim 3, wherein if said movement detecting means detects user's movements after said reproducing means reproduces the moving-viewpoint image which was created on the way to the (N+1)th shooting point for a predetermined period of time, said reproducing means is caused to reproduce a moving-viewpoint image which was created on the way to the (N+2)th shooting point next.

6. A computer-implemented image reproducing method comprising the steps of:

detecting a movement of a user in a virtual reality environment; and reproducing a plurality of stationary-viewpoint images and a plurality of moving-viewpoint images stored in image storage means in turn according to user's movements detected in the above detecting step, each of the plurality of stationary-viewpoint images being converted from a natural scene which was captured using an image generating device which was placed at each of a plurality of predetermined shooting points and was held at rest, each of the plurality of moving-viewpoint images being converted from a natural scene which was captured using the image generating device which was being moved on the way from one of the plurality of shooting points to the next shooting point, the plurality of shooting points starting from a shooting start point being arranged on a path along which the user will move in the virtual reality environment, an interval between said shooting points being controlled in accordance with a length of said user's step, and each of the plurality of shooting points starting from the shooting start point which corresponds to a start point from which the user will start to move in the virtual reality environment being referred to as the Nth shooting point (N=1 to n, and n is the number of the plural shooting points);

wherein said moving viewpoint images are captured using a video camera in a video mode so that said stored moving viewpoint images appear as natural motion to a viewer.

7. The computer-implemented image reproducing method according to claim 6, wherein if user's movements is detected in said detecting step while a stationary-viewpoint image which was created at the Nth shooting point is being reproduced, switching to reproduction of a moving-viewpoint image which was created on the way to the (N+1)th shooting point is performed, and wherein unless user's movements is detected in said detecting step after the completion of the reproduction of the moving-viewpoint image which was created on the way to the (N+1)th shooting point, a stationary-viewpoint image which was created at the (N+1)th shooting point is reproduced next.

8. The computer-implemented image reproducing method according to claim 7, wherein unless user's movements is detected in said detecting step while a stationary-viewpoint image which was created at the Nth shooting point is being reproduced for a predetermined period of time, the same stationary-viewpoint image is reproduced repeatedly.

9. The computer-implemented image reproducing method according to claim 7, wherein if user's movements is detected in said detecting step after the moving-viewpoint image which was created on the way to the (N+1)th shooting point is reproduced for a predetermined period of time, a moving-viewpoint image which was created on the way to the (N+2)th shooting point is reproduced next.

10. A method of generating and reproducing images, comprising the steps of:

generating each of a plurality of stationary-viewpoint images by capturing and converting a natural scene into each of the plurality of stationary-viewpoint images at each of a plurality of predetermined shooting points using an image generating device which is held at rest at each of the plurality of shooting points, and generating each of a plurality of moving-viewpoint images by capturing and converting a natural scene into each of the plurality of moving-viewpoint images on the way from each of the plurality of shooting points to the next shooting point using the image generating device which is being moved, so as to provide a virtual reality environment for a user, the plurality of shooting points starting from a shooting start point being arranged on a path along which the user will move in the virtual reality environment, an interval between said shooting points being controlled in accordance with a length of said user's step, and each of the plurality of shooting points starting from the shooting start point which corresponds to a start point from which the user will start to move in the virtual reality environment being referred to as the Nth shooting point (N=1 to n, and n is the number of the plural shooting points);

storing the plurality of stationary-viewpoint images and the plurality of moving-viewpoint images;

detecting a movement of the user in the virtual reality environment; and reproducing the plurality of stationary-viewpoint images and the plurality of moving-viewpoint images stored in the above storing step in turn according to users movements detected in the above detecting step;

wherein said moving viewpoint images are captured using a video camera in a video mode so that said stored moving viewpoint images appear as natural motion to a viewer;

wherein said moving viewpoint images are captured using a video camera in a video mode so that said stored moving viewpoint images appear as natural motion to a viewer.

11. The method according to claim 10, further comprising the steps of measuring environment data on environments at each of the plurality of shooting points and on the way from one of the plurality of shooting points to the next shooting point, storing the environment data measured in the above measuring step, and providing the user with a load dependent on the environment data stored in the above storing step while one stationary-viewpoint image or one moving-viewpoint image is reproduced in the reproducing step.

12. The method according to claim 10, wherein if user's movements is detected in said detecting step while a stationary-viewpoint image which was created at the Nth shooting point is being reproduced, switching to reproduction of a moving-viewpoint image which was created on the way to the (N+1)th shooting point is performed, and wherein unless user's movements is detected in said detecting step after the completion of the reproduction of the moving-viewpoint image which was created on the way to the (N+1)th shooting point, a stationary-viewpoint image which was created at the (N+1)th shooting point is reproduced next.

13. The method according to claim 12, wherein unless user's movements is detected in said detecting step while a stationary-viewpoint image which was created at the Nth shooting point is being reproduced for a predetermined period of time, the same stationary-viewpoint image is reproduced repeatedly.

14. The method according to claim 12, wherein if user's movements is detected in said detecting step after the moving-viewpoint image which was created on the way to the (N+1)th shooting point is reproduced for a predetermined period of time, a moving-viewpoint image which was created on the way to the (N+2)th shooting point is reproduced next.

15. An image reproducing system comprising:

image storage means for storing a plurality of stationary-viewpoint images each of which was converted from a natural scene which was captured using an image generating device which was placed at each of a plurality of predetermined shooting points and was held at rest, and for storing a plurality of moving-viewpoint images each of which was converted from a natural scene which was captured using the image generating device as it was moved on the way from each of the plurality of shooting points to a next shooting point, so as to provide a virtual reality environment for a user, the plurality of shooting points starting from a shooting start point being arranged on a path along which the user will move in the virtual reality environment, and each of the plurality of shooting points starting from the shooting start point which corresponds to a start point from which the user will start to move in the virtual reality environment being referred to as the Nth shooting point (N=1 to n, and n is the number of the plural shooting points), an interval between said shooting points being controlled in accordance with said user's movement, movement detecting means for detecting a movement of the user in the virtual reality environment; and reproducing means for reproducing the plurality of stationary-viewpoint images and the plurality of moving-viewpoint images stored in said image storage means in turn according to user's movements detected by said movement detecting means;

wherein said moving viewpoint images are captured using a video camera in a video mode so that said stored moving viewpoint images appear as natural motion to a viewer.

16. A method of generating and reproducing images, comprising the steps of:

generating each of a plurality of stationary-viewpoint images by capturing and converting a natural scene into each of the plurality of stationary-viewpoint images at each of a plurality of predetermined shooting points using an image generating device which is held at rest at each of the plurality of shooting points, and generating each of a plurality of moving-viewpoint images by capturing and converting a natural scene into each of the plurality of moving-viewpoint images on the way from each of the plurality of shooting points to the next shooting point using the image generating device which is being moved, so as to provide a virtual reality environment for a user, the plurality of shooting points starting from a shooting start point being arranged on a path along which the user will move in the virtual reality environment, an interval between said shooting points being controlled in accordance with said user's movement, and each of the plurality of shooting points starting from the shooting start point which corresponds to a start point from which the user will start to move in the virtual reality environment being referred to as the Nth shooting point (N=1 to n, and n is the number of the plural shooting points);

storing the plurality of stationary-viewpoint images and the plurality of moving-viewpoint images;

detecting a movement of the user in the virtual reality environment; and reproducing the plurality of stationary-viewpoint images and the plurality of moving-viewpoint images stored in the above storing step in turn according to users movements detected in the above detecting step;

wherein said moving viewpoint images are captured using a video camera in a video mode so that said stored moving viewpoint images appear as natural motion to a viewer.

* * * * *